US006941251B1

(12) United States Patent
Stallings et al.

(10) Patent No.: US 6,941,251 B1
(45) Date of Patent: Sep. 6, 2005

(54) METHOD FOR TRANSFORMING CAD MODEL USING GENERAL FUNCTION COMPOSITION MECHANISM

(75) Inventors: Paul H. Stallings, Longmont, CO (US); Barton Talbot Stander, Longmont, CO (US); Yunching Huang, Superior, CO (US); James Michael Gordon, Superior, CO (US)

(73) Assignee: Spatial Corp., Westminster, CO (US)

( * ) Notice: Subject to any disclaimer, the term of this patent is extended or adjusted under 35 U.S.C. 154(b) by 0 days.

(21) Appl. No.: 09/472,263

(22) Filed: Dec. 27, 1999

(51) Int. Cl.[7] .............................................. G06F 17/00
(52) U.S. Cl. ........................... 703/2; 700/182; 345/420; 345/474
(58) Field of Search ......................... 703/2; 345/420, 345/474; 700/182

(56) References Cited

U.S. PATENT DOCUMENTS

| | | | |
|---|---|---|---|
| 4,821,214 A | | 4/1989 | Sederberg .................... 364/522 |
| 5,278,983 A | * | 1/1994 | Kawabe et al. .............. 345/420 |
| 6,184,901 B1 | * | 2/2001 | Silva et al. .................. 345/474 |
| 6,212,484 B1 | * | 4/2001 | Chen ............................. 703/2 |
| 6,392,645 B1 | * | 5/2002 | Han et al. .................... 345/420 |
| 6,718,291 B1 | * | 4/2004 | Shapiro et al. ................ 703/2 |

OTHER PUBLICATIONS

Raghothama et al., "Boundary Representation Deformation in Parametric Solid Modeling", ACM Transactions on Graphics, vol. 17, Issue 4, Oct. 1998, pp. 259-286.*
Fane "Your Table Is Waiting . . . ", CADalyst, Jan. 1999, pp. 70-75.*
Kalay, "Modeling Polyhedral Solids Bounded by Multi-Curved Parametric Surfaces", Proceedings of the Nineteenth Design Automation Conference, 1982, pp. 501-507.*

* cited by examiner

Primary Examiner—Thai Phan
Assistant Examiner—Herng-der Day
(74) Attorney, Agent, or Firm—Eric H. Weimers; Eric P. McAlpine (57) ABSTRACT

Methods for the transformation of shapes in Computer Aided Design (CAD) applications applying a general function composition mechanism. This method allows the geometry of a shape expressed in terms of surface and curve functions and positions to be transformed by any generic function while maintaining the topography of the shape. Once the underlying geometry of the shape has been represented as a set of functions and positions, the functions and positions are composed with a transformation function to define new surface and curve functions. Once the new functions and positions have been created, the geometry of the transformed shape can be found by passing each point in the domain of each original geometry function through the new transformed function. This shape may then be displayed to the user, and the steps of this method repeated for refinement of the transformation function.

30 Claims, 6 Drawing Sheets

METHOD FOR TRANSFORMING CAD MODEL USING GENERAL FUNCTION COMPOSITION MECHANISM

FIELD OF THE INVENTION

The invention relates to the field of Computer Aided Design (CAD) applications, and more particularly, to transforming the geometry of procedural models within CAD applications by using a generalized function composition mechanism allowing transformation with arbitrary functions.

BACKGROUND OF THE INVENTION

Alteration of the geometry of a model has been known in the art. Common applications of geometry transformation include moving, scaling and rotating models, which merely apply a linear transformation to the model's geometry. Nothing in these simple transformations indicated the use of arbitrary function composition to perform more complicated, arbitrary transformations.

Geometric transformation using a single specific function is also known in the art. For example, U.S. Pat. No. 4,821,214 to Sederberg [Sederberg] demonstrates the transformation of a model defined by a grid of control points by a single specific function. [Sederberg] does not indicate the ability to perform a transformation using any arbitrary function, and [Sederberg] does not disclose defining the model using procedural surfaces, curves and positions to allow arbitrary function composition. In order to define a shape, [Sederberg] requires the user to define a set of control points that approximate the shape. In order to achieve accuracy required for many operations such as Computer Aided Manufacturing (CAM), a large number of control points must be defined which makes working with the model difficult. [Sederberg] does not disclose representing the geometry of a shape as a set of functions which allow for more accurate and easier manipulation.

Similarly, the Pro-Engineer CAD modeling product by Parametric Technologies Corporation [PTC] contains a bend function which allows a user to perform a specific, predefined bend transformation function. Nothing in [PTC] discloses using a general function composition mechanism to allow transformation with an arbitrary, user-defined function.

Because of the limitations of the prior art, there exists a continuing need to allow geometric transformation in CAD applications using a generalized mechanism for applying arbitrary functions.

SUMMARY OF THE INVENTION

The present invention overcomes the limitations of the prior art by providing methods for accurately transforming CAD models represented by procedural curves and surfaces through a general function composition mechanism allowing transformation by any arbitrary function.

It is an object of this invention to provide a general function composition mechanism to transform solid models represented as procedural curves and surfaces using any arbitrary function as a transformation function. A shape in a solid model consists of a topography and a geometry. The topography of the shape defines how the faces, edges and vertices of the shape connect to one another. The geometry of the shape underlies those faces, edges and vertices with surfaces, curves and positions, respectively, which define the location in space of the set of points of the shape and its component parts.

Because the surfaces and curves of the shape may be defined by a set of functions which map points from a domain space into 3-dimensional space, space warping allows the geometry of a shape to be altered by an arbitrary transformation function without changing the topography of the shape. These underlying functions may be transformed through function composition with the transformation function into new surface and curve functions. The positions of the original shape may simply be passed through the transformation function to provide the positions of the new shape. The new geometry of the shape may be determined by passing each point in the domain of each of the original surface and curve functions through that function's corresponding new composed function. The resulting set of points represents the geometry of the new shape.

It is a further object of this invention to provide an easy, interactive mechanism for allowing a user to transform solid models using an arbitrary transformation function. In order to provide this interactivity, the original shape is first displayed to the user. The user may then define a function with which to transform the shape. Once the shape has been transformed, the resulting shape is shown to the user. The user may then keep the transformed shape or refine the transformation function further.

It is a further object of this invention to allow the user to accurately perform specific transformations representing structural deformations of an object, such as bending, twisting or stretching the object, by transforming the functions representing the geometry of the object.

DETAILED DESCRIPTION OF THE INVENTION

I. Introduction

Space warping is the process of applying a transformation of three-dimensional Euclidean space, or $\Re^3$ to $\Re^3$, to a CAD model. A CAD model is a computer model of an object that is represented by a set of faces, edges and vertices. The faces have underlying them surfaces, the edges have underlying them curves, and the vertices are at given positions in space. The faces, edges and vertices of a CAD model are called the topology of the model. The surfaces, curves and positions are called the geometry of the model. The topology of the model indicates how the faces, edges and vertices of the model connect to each other, while the geometry of the model indicates the location of the points underlying the model and its component parts in space. Space warping is a process by which the geometry of a model is changed leaving the topology the same.

The present invention allows accurate transformation of a CAD model by an arbitrary function using a generalized transformation mechanism. The method may be applied to shape representations that are commonly used in CAD applications and reduces the problem of transformation to the composition of the transformation function and the surface functions, curve functions, and positions underlying the initial shape representation.

The methods discussed herein must be performed in a solid modeler. A solid modeler that is suitable for performing the methods discussed herein is ACIS Geometric Modeler which is commercially available from Spatial Technology Inc., Boulder, Colo. ACIS is written in C++. Specific embodiments of the invention will be discussed as using ACIS. However, the present invention, including each of the specific embodiments described herein, may be practiced with other solid modelers.

Throughout this description, we describe one possible embodiment of the invention in which the CAD model being transformed is defined using a boundary representation. Of course, other shape representations may be used, as long as the shape is capable of being represented as a set of surface or curve functions and positions.

A. Technical Background

Figure 1:
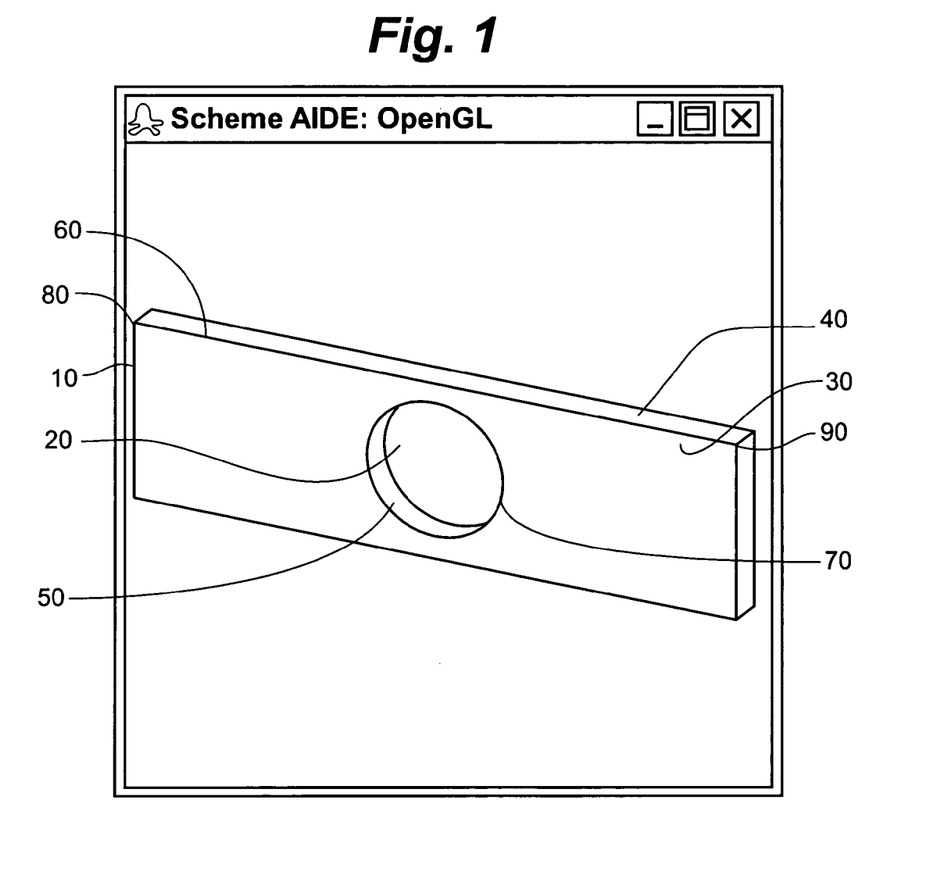
FIG. 1: Diagram of initial CAD model of shape.

The principal idea in Space Warping is to allow end users to accurately transform the geometry of CAD models through a generalized transformation mechanism allowing transformation with any arbitrary function. As shown in FIG. 1, CAD applications may represent a shape consisting of faces 30, 40, 50, edges 60, 70 and vertices 80, 90, and its underlying surfaces, edges and positions. The shape of figure one consists of a block 10 with a hole in it 20. It has seven faces 30, 40, 50, fourteen edges 60, 70, and ten vertices 80, 90, two of which are on the hole. The underlying geometry of the model therefore has seven surfaces, fourteen curves, and ten positions. The topography of the block 10 is such that the front face 30 is connected to the top face 40 at the front, top edge 60. Note that the interior sides of the hole, interior face 50, is connected to the front face by the front interior edge 70. The front, top edge 60 is a line segment connected between two vertices, the front, top left vertex 80, and the front, top right vertex 90.

In a procedural model, a surface in 3-dimensional space is defined in a parametric form by a function s from $\Re^2$ to $\Re^3$, which maps points from a 2-dimensional domain space (u,v) to a 3-dimensional image space (x,y,z). The parametric form for a surface may be expressed as:

$$s(u, v) = \begin{bmatrix} x(u, v) \\ y(u, v) \\ z(u, v) \end{bmatrix}$$

Typically, u and v are bounded in some way, for example, 0<=u<=1, and 0<=v<=1, finishing the definition of the surface's domain space. The surface function determines the geometry of the surface by mapping each point in the domain space (u,v) of the function to a corresponding point in 3-dimensional space (x,y,z). The set of resulting points in (x,y,z) space is the geometry of the surface.

Similarly, a curve in 3-dimensional space may be defined by a parametric function c from $\Re^1$ to $\Re^3$, which maps points from a 1-dimensional domain space (t) to a 3-dimensional image space (x,y,z). Typically, t is also bounded in some way, such as 0<= t<=1. The parametric form for the curve may be expressed as:

$$c(t) = \begin{bmatrix} x(t) \\ y(t) \\ z(t) \end{bmatrix}$$

The curve function determines the geometry of the curve by mapping each point in the domain space (t) of the function to a corresponding point in 3-dimensional space (x,y,z). The set of resulting points in (x,y,z) space is the geometry of the curve.

Finally, a position defines a precise location in 3-dimensional space (x,y,z).

B. Transforming the Geometry of a Shape

Representing the underlying surface and curve geometry of a shape as a set of functions allows us to easily create a new geometry for the shape by composing these functions with an arbitrary transformation function. This approach allows a user to define any arbitrary function, warp the model to view the new geometry and refine the warp by altering the transformation function until the desired geometry is achieved.

Figure 2:
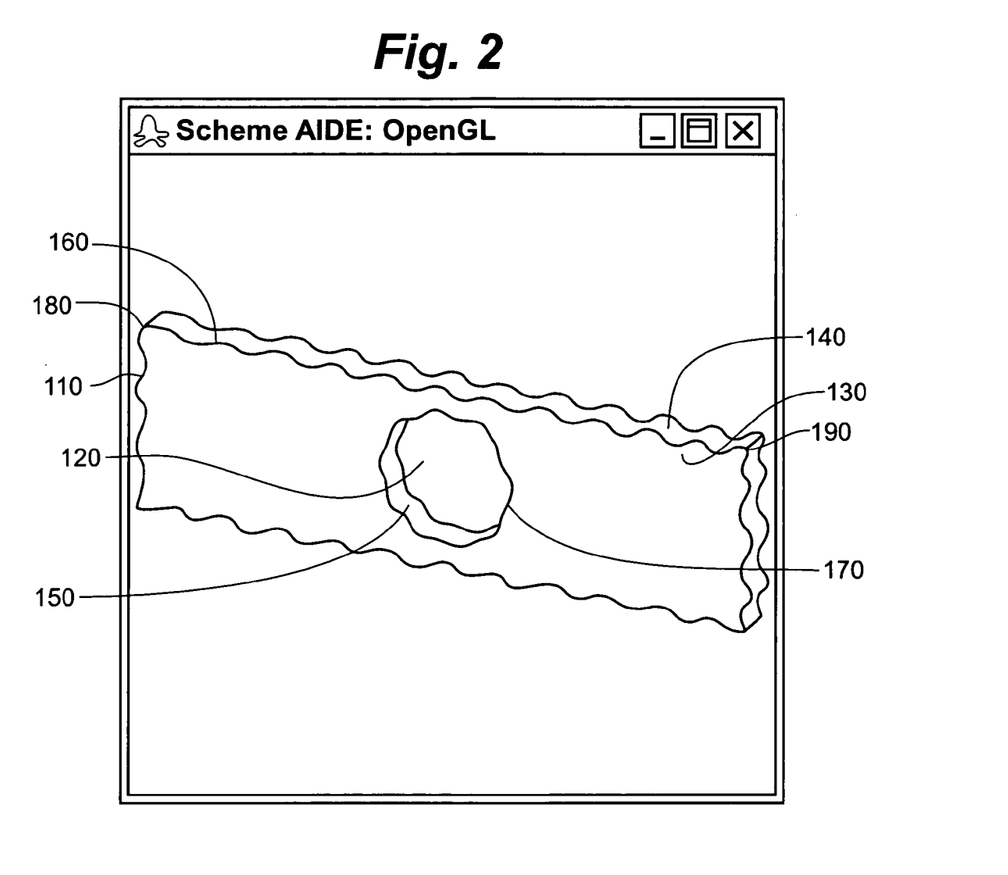
FIG. 2: Diagram of model after complex warp of shape.

Transformation of a shape occurs by transforming each point in the geometry of a shape by a transformation function f from $\Re^3$ to $\Re^3$, which takes as input a point in (x,y,z) space and transforms that specific point into another location in (x,y,z) space, such that f(x,y,z)=(x',y',z'). For example, a transformation function for adding a sine wave transformation to the y-coordinate of a shape might be defined as $f(x,y,z)=f(x,y+\sin(x), z)$. In FIG. 2, the block 10 of FIG. 1 is transformed into a new block 110 with the function $f(x,y,z)=(x,y+\sin(x)*\cos(x), z)$. It should be noted that the topography of the new shape still contains the same faces, edges and vertices connected as before, but the geometry underlying that topography has been changed. The front face 130 of the new shape is still connected to the top face 140 by the front, top edge 160, and the front, top edge 160 is still connected between the front, top left vertex 180 and the front, top right vertex 190. The only difference between FIG. 1 and FIG. 2 is that the location of the points underlying the topography in (x,y,z) space has changed.

Figure 3:
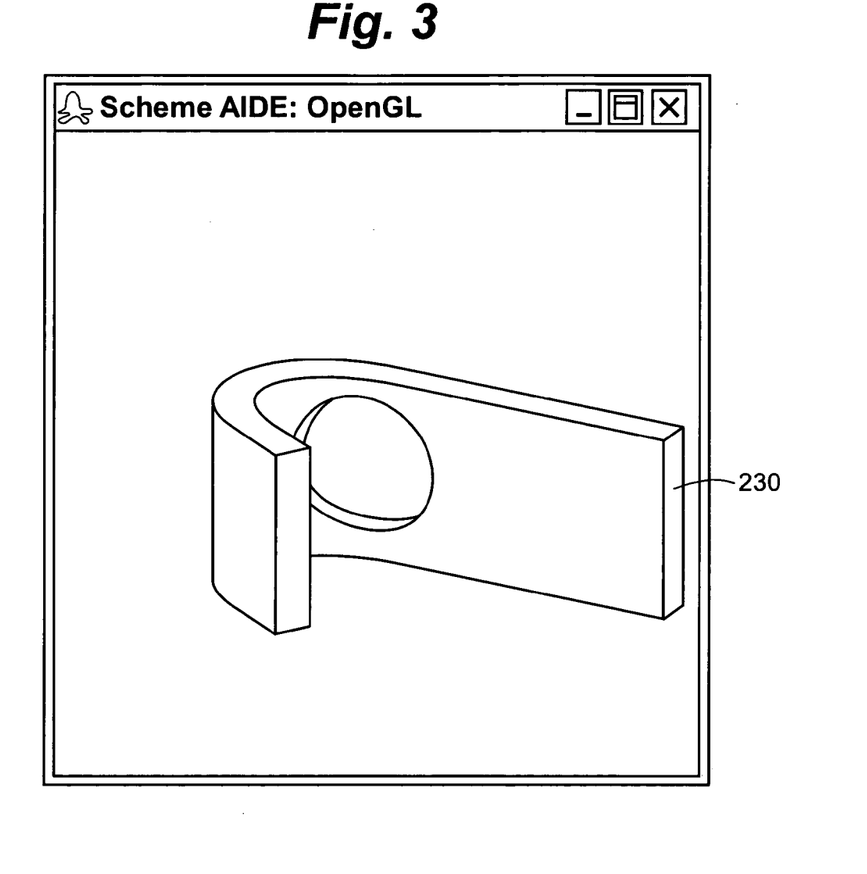
FIG. 3: Diagram of model after bend warp.
Figure 4:
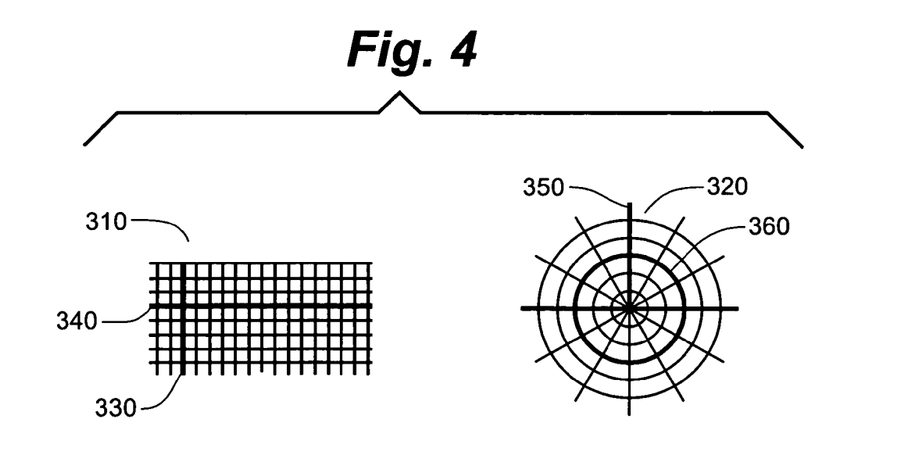
FIG. 4: Schematic diagram illustrating bend warp changing geometry.

FIGS. 3 and 4 illustrate how a bend transformation affects the curves defining a particular surface. FIG. 3 shows how the block 10 of FIG. 1 is transformed into a new block 230 using a bend warp, which takes all points in a specified region and warps them into concentric arcs around a particular plane at a specified angle. FIG. 4 shows a B-spline representation of a surface patch defined by a set of curves 330, 340 in the domain space (u,v). The resulting curves 350, 360 after the bend transformation define the new surface 320.

The present invention allows the user to easily and accurately transform the initial shape by any arbitrary function. Because the underlying geometry of a shape may be expressed as a set of functions and positions which define the set of all of the points of the geometry, these functions may be easily composed with any transformation function to create new functions. Function composition involves concatenating one function with another function, such that the output value of the first function is used as the input value of the second function. An example of a composition of two functions from $\Re^3$ to $\Re^3$, where the first function is $f_1(x,y,z)=(x+1,y+1,z+1)$ and the second function is $f_2(x,y,z)=(x^2, y^2, z^2)$ could be expressed either as $f_2(f_1(x,y,z))$, or more conveniently as $f_2 \cdot f_1(x,y,z)=[(x+1)^2, (y+1)^2, (Z+1)^2]$.

In order to transform the geometry of a shape by an arbitrary function, the functions and positions underlying the existing geometry are simply composed with the transformation function f(x,y,z). For example, if one of the surfaces of the shape can be described by the surface function $$s1(u, v) = \begin{bmatrix} x(u, v) \\ y(u, v) \\ z(u, v) \end{bmatrix},$$

and the transformation function f is defined as f(x,y,z)=(x'(x),y'(y),z'(z)), the new surface function sf1 will be defined as:

$$f \cdot s1(u, v) = \begin{bmatrix} x'(x(u, v)) \\ y'(y(u, v)) \\ z'(z(u, v)) \end{bmatrix}$$

Similarly, if one of the curves of the shape can be described by the curve function c1

$$c1(t) = \begin{bmatrix} x(t) \\ y(t) \\ z(t) \end{bmatrix},$$

the new curve function cf1 will be defined as:

$$f \cdot c1(t) = \begin{bmatrix} x'(x(t)) \\ y'(y(t)) \\ z'(z(t)) \end{bmatrix}$$

Once all of the functions defining the surfaces and curves of the shape's geometry have been transformed into new surface and curve functions, the geometry of the new shape can be easily calculated by taking all points in the domain of each original function, and calculating the output value of the corresponding new function. The positions for the new shape are calculated by passing the original positions of each vertex through the transformation function. The resulting set of points is the geometry of the new shape.

C. Method

Figure 5:
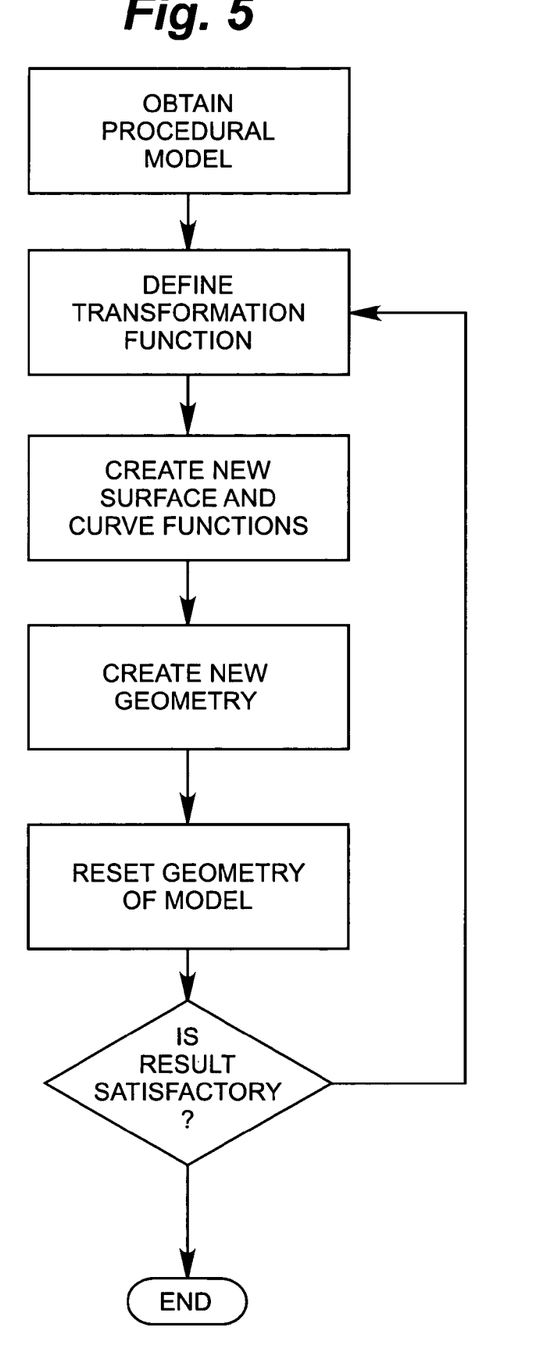
FIG. 5: Process flow diagram of space warping method.

The basic sequence of space warping is shown in FIG. 5.

STEP 1-Obtain a procedural model of a shape by defining surface functions, curve functions and positions of the shape. If the shape representation does not define the underlying geometry in terms of functions, convert the shape representation to one using underlying functions.

Substep 1-1: Define all the surfaces in all faces of the body using surface functions s1, s2, s3 ... from $\Re^2$ to $\Re^3$.

Substep 1-2: Define all the curves in all the edges of the body into curve functions c1, c2, c3 ... from $\Re^1$ to $\Re^3$.

STEP 2: Define a transformation function f from $\Re^3$ to $\Re^3$. The transformation function f takes a point in (x,y,z) space and transforms it into a new point in (x,y,z) space.

STEP 3-Create new functions and positions by performing function composition with the transformation function.

Substep 3-1: Surfaces.

Given the transformation function f from Step 2, take the function composition of each of the functions from Substep 1—1 with f to create a new set of surface functions sf1, sf2, sf3 ... from $\Re^2$ to $\Re^3$.

Substep 3-2: Curves.

Given the transformation function f from Step 2, take the function composition of each of the curve functions from step 1 with f to create a new set of curve functions cf1, cf2, cf3 ... from $\Re^1$ to $\Re^3$.

STEP 4-Convert the new functions and positions of Step 3 into the new geometry of the shape.

Substep 4-1: Surfaces.

Create a new set of surfaces ws1, ws2, ws3 ... from the functions created in Substep 3-1 by taking each of the points in the domain of the original surface functions (s1, s2, s3 ...) and passing these points through the new surface functions (sf1, sf2, sf3 ...).

Substep 4-2: Curves.

Create a new set of curves wc1, wc2, wc3 ... from the functions created in Substep 3-2 by taking each of the points in the domain of the original curve functions (c1, c2, c3 ...) and passing these points through the new surface functions (cf1, cf2, cf3 ...).

Substep 4-3: Positions.

Pass each of the positions in the vertices of the body through the transformation function f to create new positions pf1, pf2, pf3 ....

STEP 5-Reset geometry of CAD model.

Reset the geometry of the CAD model with the new surfaces (ws1, ws2, ws3 ...), curves (wc1, wc2, wc3 ...) and positions (pf1, pf2, pf3 ...).

STEP 6-END?

Display the new geometry of the shape. If the new shape is not satisfactory, repeat the method with a refined transformation function.

D. Specific Implementations of Space Warping

Examples of specific transformations are shown below. Of course, a user is not limited to these specific transformations but may use the general function composition mechanism to transform the shape with any arbitrary function.

1. Twisting

Figure 6:
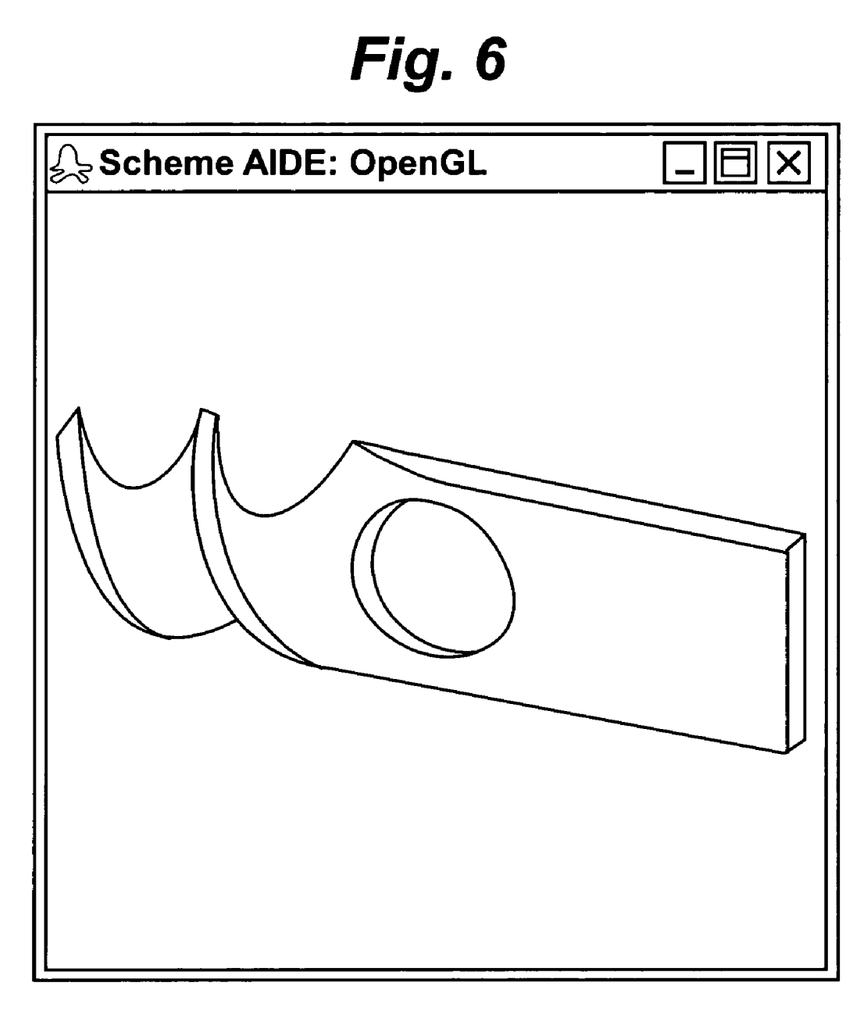
FIG. 6: Diagram of model after twist warp.

As shown in FIG. 6, the present invention may be used to perform a twist transformation on the original block 10 of FIG. 1. The twisting function operates on space by rotating every point in space (or a subset of space) around an axis by a specified angle. For example, if the user desires to twist warp a shape by an angle of PI radians, the user must first define the axis around which to perform the twist, which may be a line or line segment. Next, all the points in space, or the subset of space defined by planes perpendicular to the start and end points of a line segment, will be transformed according to the following transformation function:

$F(x,y,z)=(x*\cos(z*PI)-y*\sin(z*PI), x*\sin(z*PI)+y*\cos(z*PI), z).$

2. Bending

As shown in FIG. 3, the present invention may be used to perform a bend transformation on the original block 10 of FIG. 1. The bend function operates on space (or a subset of space) by taking all points in a specified region and warping them into concentric arcs around a particular plane at a specified angle.

3. Stretching

Figure 7:
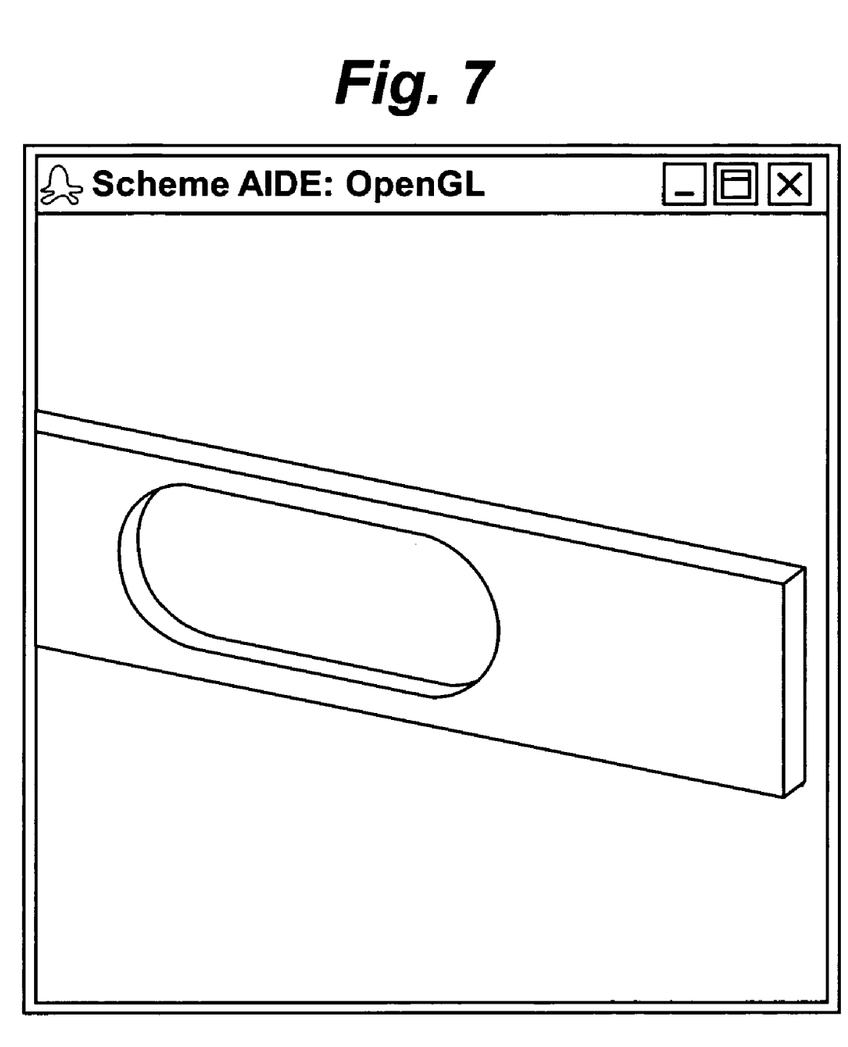
FIG. 7: Diagram of model after stretch warp.

As shown in FIG. 7, the present invention may be used to perform a stretching transformation on the original block 10 of FIG. 1. The stretch function operates on space by translated each point in the specified region by a certain distance in the direction of a unit vector, without affecting the point's position along the other axes.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosures. The scope of the invention is to be defined only by the claims appended hereto, and by their equivalents.

We claim:

1. A method for transforming the geometry of a solid model with an arbitrary transformation function, comprising the steps of:

providing a procedural solid modeler which supports using procedural surfaces and curves to allow the use of composition of arbitrary functions to define surface and curve geometry functions, said modeler comprising a transformation component adapted to permit the definition of arbitrary transformation functions and to create composed surface and curve geometry functions by composing surface and curve geometry functions with said arbitrary transformation functions;

obtaining a solid model having a topology and a geometry corresponding to said topology, said topology comprising one or more faces, edges and/or vertices, said geometry comprising one or more surfaces, curves, and/or positions, where each surface in the geometry corresponds to a face in the topology, each curve in the geometry corresponds to an edge in the topology, and each position in the geometry corresponds to a vertex in the topology, and each surface or curve is defined by a parametric function mapping from a domain space to 3-dimensional space;

defining a transformation function;

operating said transformation component to transform the geometry of the solid model by creating new surfaces, curves and/or positions defined by composing each surface and curve function of the geometry with said transformation function and by transforming each position of the geometry by said transformation function; and resetting the geometry of said solid model to create a procedural solid model by replacing the underlying geometry of each face, edge and/or vertex with surface, curve and/or position geometry, respectively, defined in the case of surface and curve geometry by the new, transformed functions corresponding to the original representing functions and in the case of position geometry by the new, transformed positions.

2. The method as claimed in claim 1, further comprising the step of displaying the solid model after the step of transforming the geometry.

3. The method as claimed in claim 1, further comprising the step of storing said solid model after the step of transforming the geometry.

4. The method as claimed in claim 1 where the transformation function defines a non-linear transformation.

5. The method as claimed in claim 1 where the transformation function defines a bend transformation.

6. The method as claimed in claim 1 where the transformation function defines a stretch transformation.

7. The method as claimed in claim 1 where the transformation function defines a twist transformation.

8. The method as claimed in claim 1 where the transformation function is a non-polynomial function.

9. The method as claimed in claim 1 where the transformation function is a trigonometric function.

10. The method as claimed in claim 1 wherein the transformation component supports non-polynomial functions.

11. The method as claimed in claim 1 wherein the transformation component supports trigonometric functions.

12. The method as claimed in claim 1 wherein the transformation component supports non-linear transformations.

13. The method as claimed in claim 1 wherein the transformation component supports bend transformations.

14. The method as claimed in claim 1 wherein the transformation component supports stretch transformations.

15. The method as claimed in claim 1 wherein the transformation component supports twist transformations.

16. A method for transforming a solid model using a generalized transformation function mechanism, comprising the steps of:

providing a computer aided design system based on a solid modeler which supports using procedural surfaces and curves to allow the use of composition of arbitrary functions to define surface and curve geometry functions, said solid modeler having a transformation component adapted to permit the definition of arbitrary transformation functions and to create composed surface and curve geometry functions by composing surface and curve geometry functions with said arbitrary transformation functions;

obtaining a procedural solid model, wherein said solid model has a geometry and a topology, said geometry comprises one or more surfaces, curves and/or positions, where each surface or curve is defined by a function, and said topology comprises one or more faces, edges and/or vertices, where each surface in the geometry corresponds to a face in the topology, each curve in the geometry corresponds to an edge in the topology and each position in the geometry corresponds to a vertex in the topology;

obtaining a transformation function;

operating said transformation component to create new surfaces, curves and/or positions defined by composing each surface and curve function of the geometry with said transformation function and by transforming each position of the geometry by said transformation function; and resetting the geometry of said solid model to create a procedural solid model by replacing the underlying geometry of each face, edge and/or vertex with surface, curve and/or position geometry, respectively, defined in the case of surface and curve geometry by the new, transformed functions corresponding to the original representing functions and in the case of position geometry by the new, transformed positions.

17. The method as claimed in claim 16 where the transformation function defines a non-linear transformation.

18. The method as claimed in claim 16 where the transformation function defines a bend transformation.

19. The method as claimed in claim 16 where the transformation function defines a stretch transformation.

20. The method as claimed in claim 16 where the transformation function defines a twist transformation.

21. The method as claimed in claim 16, further comprising the step of displaying the solid model after the step of transforming the geometry.

22. The method as claimed in claim 16, further comprising the step of storing the solid model after the step of transforming the geometry.

23. The method as claimed in claim 16 where the transformation function is a non-polynomial function.

24. The method as claimed in claim 16 where the transformation function is a trigonometric function.

25. The method as claimed in claim 16 wherein the transformation component supports non-polynomial functions.

26. The method as claimed in claim 16 wherein the transformation component supports trigonometric functions.

27. The method as claimed in claim 16 wherein the transformation component supports non-linear transformations.

28. The method as claimed in claim 16 wherein the transformation component supports bend transformations.

29. The method as claimed in claim 16 wherein the transformation component supports stretch transformations.

30. The method as claimed in claim 16 wherein the transformation component supports twist transformations.

* * * * *